United States Patent [19]

Momber

[11] Patent Number: 5,480,555
[45] Date of Patent: Jan. 2, 1996

[54] CONTROL SYSTEM FOR A WATER SOFTENER, CONTROL DEVICE THEREFOR AND METHODS OF MAKING THE SAME

[75] Inventor: Gregory J. Momber, Grand Rapids, Mich.

[73] Assignee: Robertshaw Controls Company, Richmond, Va.

[21] Appl. No.: 254,174

[22] Filed: Jun. 6, 1994

[51] Int. Cl.$^6$ ........................................... C02F 1/42
[52] U.S. Cl. .................. 210/662; 210/96.1; 210/140; 210/190; 210/746; 324/443
[58] Field of Search ....................... 210/96.1, 139, 210/140, 143, 190, 269, 746, 792, 85, 662, 670; 324/439, 446, 443

[56] References Cited

U.S. PATENT DOCUMENTS

| | | | |
|---|---|---|---|
| 1,919,284 | 7/1933 | Walter | 324/443 |
| 3,246,759 | 4/1966 | Matalon | 210/140 |
| 3,383,310 | 5/1968 | Ammer | 324/443 |
| 4,257,887 | 3/1981 | Rak et al. | 210/140 |
| 4,299,698 | 11/1981 | Rak et al. | 210/96.1 |
| 4,917,794 | 4/1990 | Fettes et al. | 210/140 |
| 5,138,264 | 8/1992 | Seki et al. | 324/439 |
| 5,234,601 | 8/1993 | Janke et al. | 210/140 |
| 5,277,363 | 1/1994 | Hart | 236/46 R |

*Primary Examiner*—Joseph W. Drodge
*Attorney, Agent, or Firm*—Fulbright & Jaworski

[57] ABSTRACT

A control system for a water softener, control device therefor and methods of making the same are provided, the system comprising a microcontroller operatively interconnected to an output of a comparator to effect a subsequent operation of a recycling unit for the water softener when the output signal is at a certain condition thereof, the system causing the output signal to have a phase shift relative to the phase of an A.C. power supply of the system when a sensing electrode unit in the ion exchange bed of the water softener is at a certain resistance value relative to the resistance value of a reference electrode unit that is also disposed in the ion exchange bed, the phase shift comprising the certain condition of the output signal, the microcontroller determining the certain condition by comparing the phase of the output signal to the certain phase.

16 Claims, 3 Drawing Sheets

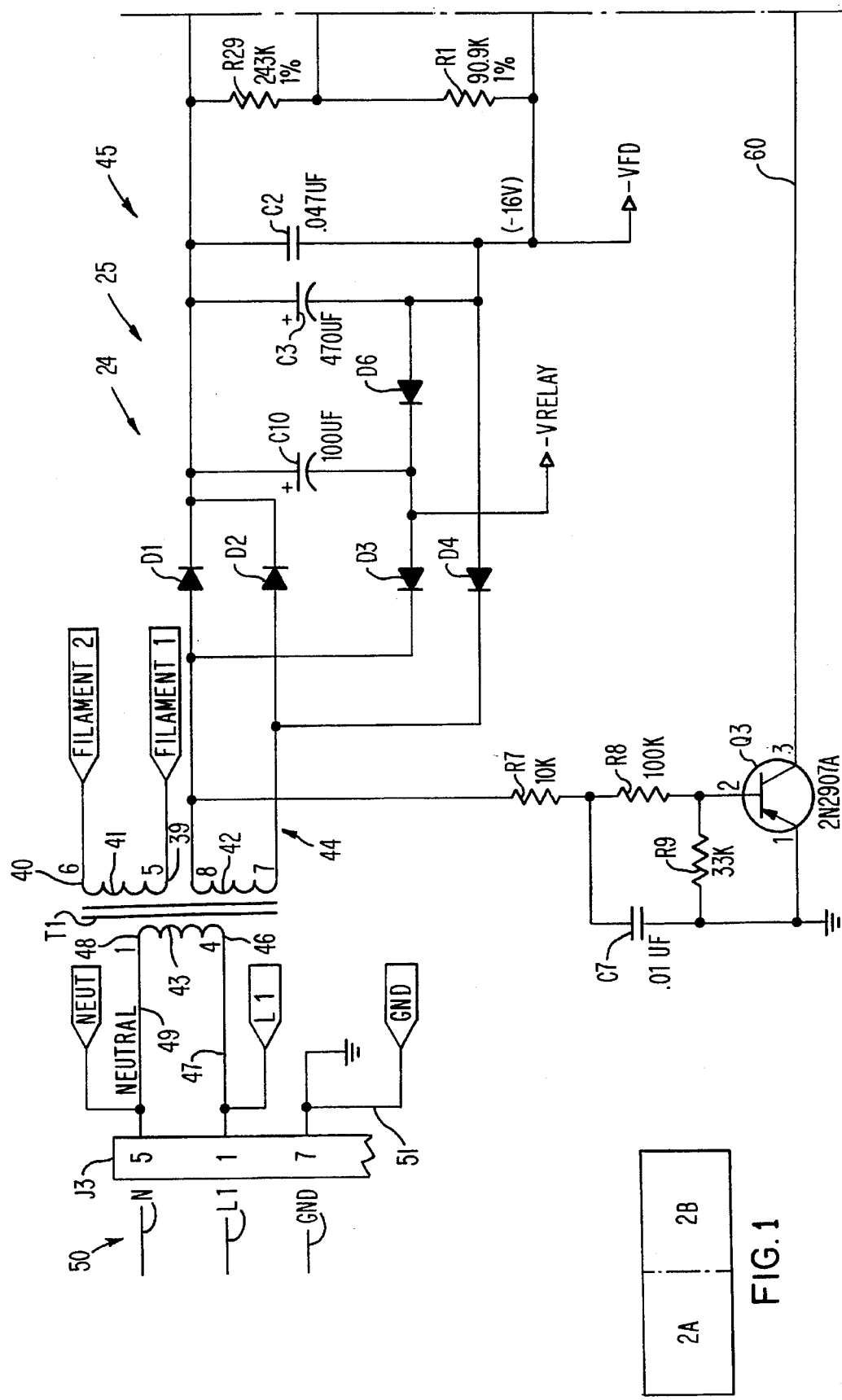

5,480,555

CONTROL SYSTEM FOR A WATER SOFTENER, CONTROL DEVICE THEREFOR AND METHODS OF MAKING THE SAME

BACKGROUND OF THE INVENTION

1. Field of the Invention

This invention relates to a new control system for a water softener and to a new control device for such a system as well as to new methods of making such a control system and such a control device.

2. Prior Art Statement

It is known to applicant to provide a control system for a water softener that has an ion exchange bed and a recycling means for the bed, the system comprising a pair of resistor means, reference electrode means, sensing electrode means, the electrode means being disposed in the bed, the electrode means and the resistor means comprising a bridge circuit means having juncture point means, an A.C. power supply means for supplying an A.C. signal means to the bridge circuit means and having a certain phase, a comparator having a first input means for receiving a first signal from one of the juncture point means that is disposed between the reference electrode means and one of the pair of resistor means and having a second input means for receiving a second input signal from another of the juncture point means that is disposed between the sensing electrode means and the other of the pair of resistor means, the comparator having an output means, and a microcontroller means having means operatively interconnected to the output means for receiving output signal means therefrom and having means to effect a subsequent operation of the recycling means when the output signal means is at a certain condition thereof, the system having means for causing the output signal means to have a phase shift relative to the certain phase when the sensing electrode means is at a certain resistance value relative to the resistance value of the reference electrode means, the phase shift comprising the certain condition of the output signal means, the system having diode means and capacitor means for creating a D.C. level that is sensed by the microcontroller means for determining the certain condition of the output signal means.

Such prior known control system also has a capacitor means interconnected to the microcontroller means and to the A.C. power supply means to provide power to the microcontroller means during a loss of power by the A.C. power supply means. However, such microcontroller means for such system does not have a halt mode.

Also see the U.S. patent to Rak et al, U.S. Pat. No. 4,299,698 for a similar control system for a water softener wherein the control system does not have a microcontroller.

Also see the U.S. patent to Hart, U.S. Pat. No. 5,277,363 wherein capacitor means is provided to supply electrical energy means to an electronic control logic unit should the main power source therefor cease to operate so as to maintain the data thereof even for a relatively long period of time.

SUMMARY OF THE INVENTION

It is one of the features of this invention to provide a new control system for a water softener wherein the phase of the A.C. power supply means for the system is utilized as a reference to compare with the phase of an output signal means of a comparator that is supplied inputs from a bridge circuit means and is utilized by a microcontroller means to determine when the ion exchange bed of the water softener is to be rejuvenated.

In particular, it was found according to the teachings of this invention that the diode means and capacitor means of the prior known control system which provided a D.C. level output means of the comparator thereof to the microcontroller thereof could be eliminated if the microcontroller merely compared the phase of the A.C. power supply means with the phase of the output signal means of the comparator.

For example, one embodiment of this invention comprises a control system for a water softener that has an ion exchange bed and a recycling means for the bed, the system comprising a pair of resistor means, reference electrode means, sensing electrode means, the electrode means being disposed in the bed, the electrode means and the resistor means comprising a bridge circuit means having juncture point means, an A.C. power supply means for supplying an A.C. signal means to the bridge circuit means and having a certain phase, a comparator having a first input means for receiving a first signal from one of the juncture point means that is disposed between the reference electrode means and one of the pair of resistor means and having a second input means for receiving a second input signal from another of the juncture point means that is disposed between the sensing electrode means and the other of the pair of resistor means, the comparator having an output means, and a microcontroller means having means operatively interconnected to the output means for receiving output signal means therefrom and having means to effect a subsequent operation of the recycling means when the output signal means is at a certain condition thereof, the system having means for causing the output signal means to have a phase shift relative to the certain phase when the sensing electrode means is at a certain resistance value relative to the resistance value of the reference electrode means, the phase shift comprising the certain condition of the output signal means, the microcontroller means having means for determining the certain condition by comparing the phase of the output signal means to the certain phase.

Accordingly, it is an object of this invention to provide a new control system for a water softener, the system of this invention having one or more of the novel features of this invention as set forth above or hereinafter shown or described.

Another object of this invention is to provide a new method of making such a control system, the method of this invention having one or more of the novel features of this invention as set forth above or hereinafter shown or described.

Another object of this invention is to provide a new control device for such a control system, the control device of this invention having one or more of the novel features of this invention as set forth above or hereinafter shown or described.

Another object of this invention is to provide a new method of making such a new control device, the method of this invention having one or more of the novel features of this invention as set forth above or hereinafter shown or described.

Other objects, uses and advantages of this invention are apparent from a reading of this description which proceeds with reference to accompanying drawings forming a part thereof and wherein:

BRIEF DESCRIPTION OF THE DRAWINGS

FIG. 1 is a schematic view illustrating how FIGS. 2A and 2B are to be positioned relative to each other in order to illustrate part of the control system of this invention as well as part of the control device of this invention.

FIG. 2A illustrates part of the control system of this invention and part of the control device of this invention.

FIG. 2B illustrates another part of the control system of this invention and another part of the control device of this invention.

DESCRIPTION OF THE PREFERRED EMBODIMENT

Figure 2B:
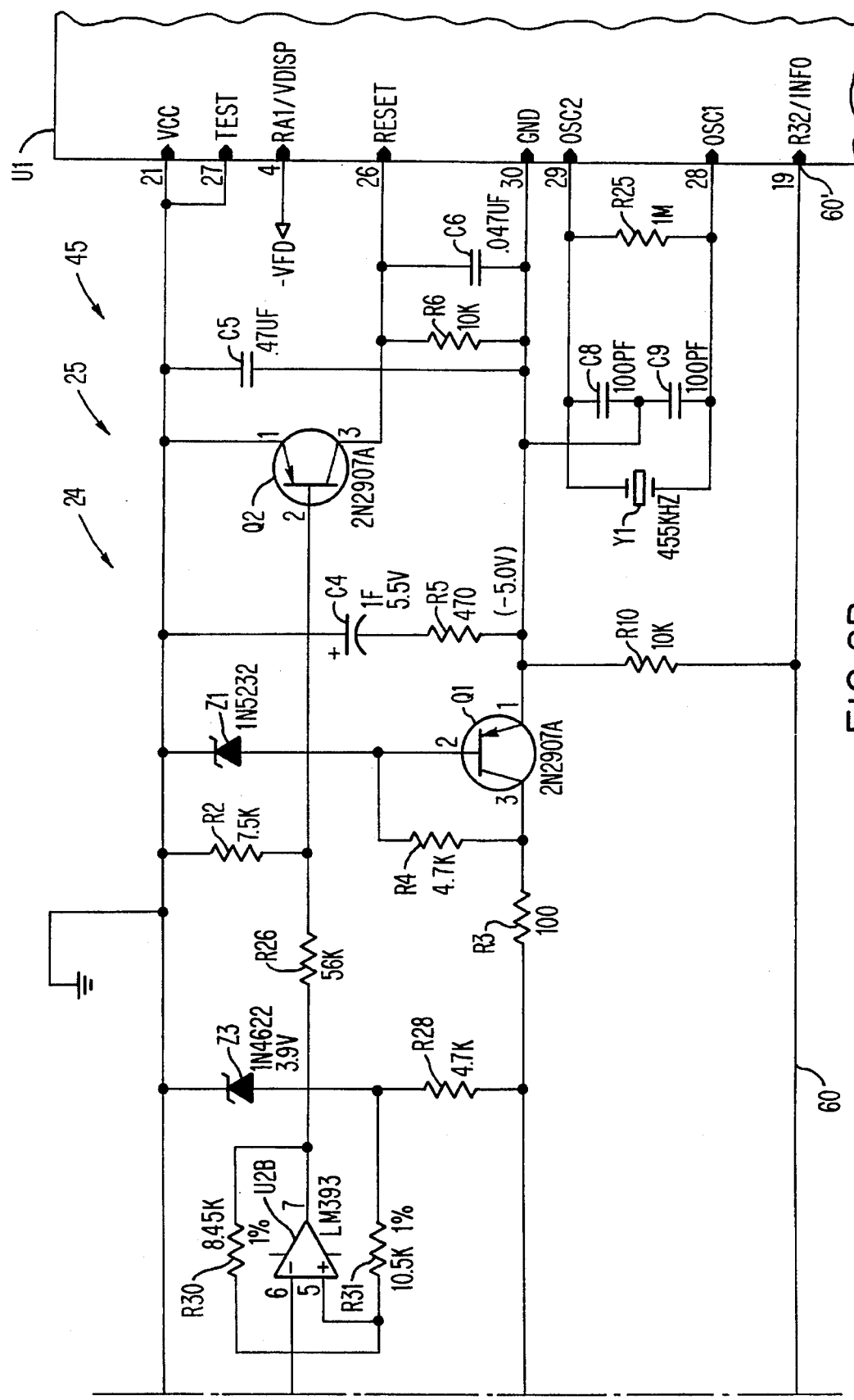

While the various features of this invention are hereinafter illustrated and described as being particularly adapted to provide a control system for controlling the operation of a particular water softener, it is to be understood that the various features of this invention can be utilized singly or in various combinations thereof to provide a control system for other types of water softeners, as desired.

Therefore, this invention is not to be limited to only the embodiment illustrated in the drawings, because the drawings are merely utilized to illustrate one of the wide variety of uses of this invention.

Figure 3:
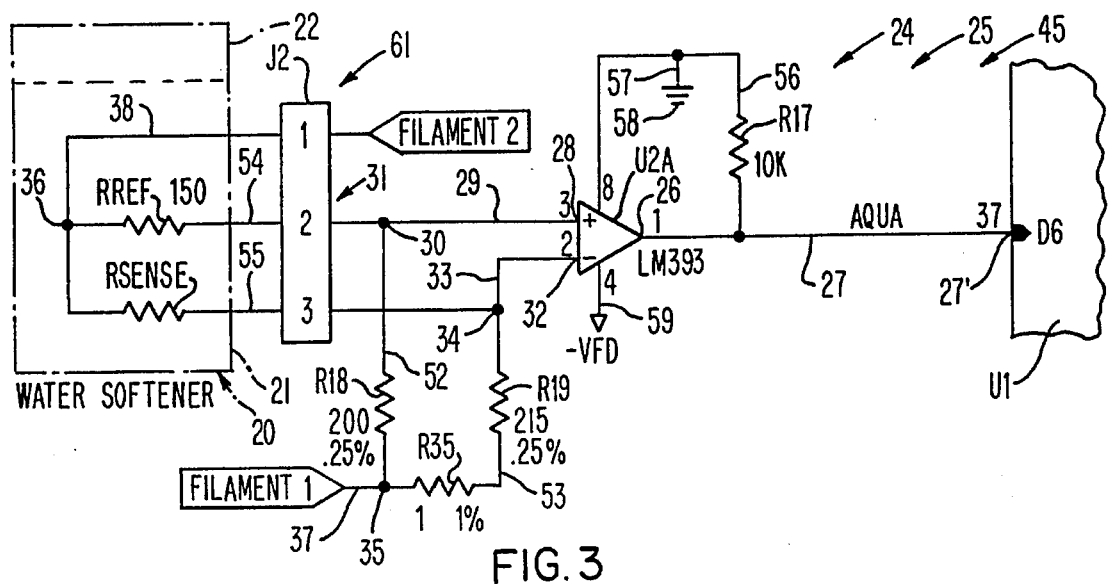
FIG. 3 illustrates another part of the control system of this invention and another part of the control device of this invention, FIG. 3 also schematically illustrating the water softener being controlled by the control system of this invention and the control device of this invention.
Figure 5:
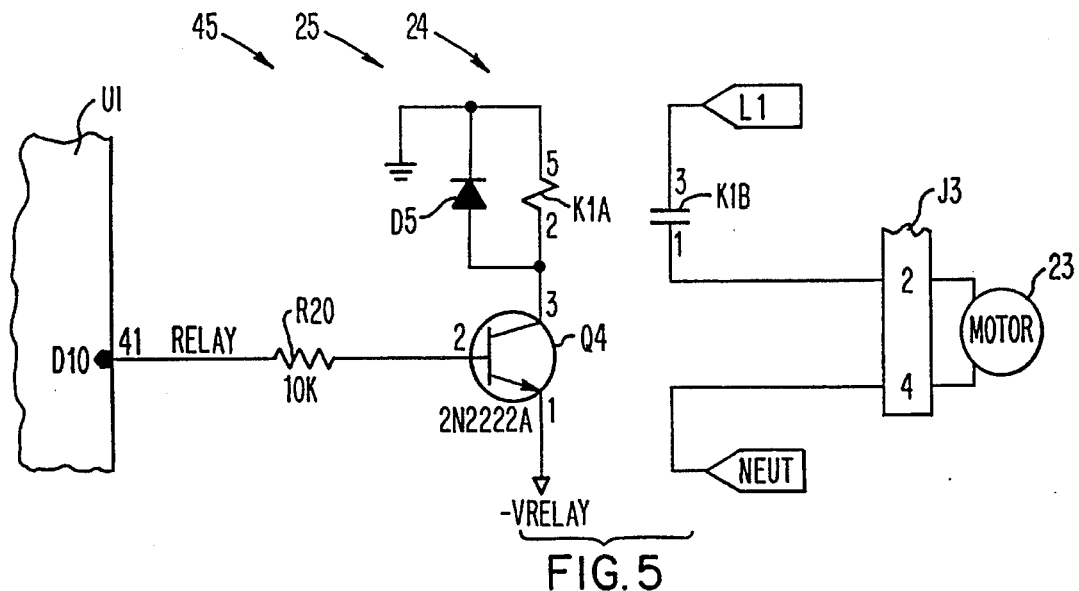
FIG. 5 illustrates another part of the control system of this invention and another part of the control device of this invention.

Referring now to FIG. 3, a water softener is generally indicated by the reference numeral 20 and comprises an ion exchange bed 21 and a control unit 22 that is operated by a motor 23, FIG. 5, to rejuvenate the ion exchange bed 21 when the motor 23 is energized by a control system of this invention that is generally indicated by the reference numeral 24 in FIGS. 2A, 2B, 3 and 5, the control system 24 of this invention comprising a control device that is generally indicated by the reference numeral 25 in FIGS. 2A, 2B, 3 and 5.

In general, the system 24 of this invention operates the water softener 20 in a manner similar to the operation of the water softener disclosed in the aforementioned U.S. patent to Rak et al, U.S. Pat. No. 4,299,698 whereby this U.S. patent is being incorporated into this disclosure by this reference thereto.

However, as previously set forth, the control system in the U.S. patent to Rak et al, U.S. Pat. No. 4,299,698 does not include a microcontroller therein, but, as also previously set forth, it is known to applicant to utilize a microcontroller in the control system of the U.S. patent to Rak et al, U.S. Pat. No. 4,299,698 and to provide a D.C. level from the output means of the comparator A1 illustrated in FIG. 2 of the U.S. patent to Rak et al, U.S. Pat. No. 4,299,698 through the use of diode means and capacitor means in the output line of such comparator before the same reaches the microcontroller.

As previously stated, one of the features of this invention is to provide a control system wherein such diode means and capacitor means in the output line of the comparator are eliminated as will be apparent hereinafter.

Such comparator of the control system 24 of this invention is indicated by the reference numeral U2A in FIG. 3 and has its output 26 interconnected by a lead or electrical line 27 to an input port 27' of a microcontroller that is designated U1 in FIGS. 2B, 3 and 5.

The comparator U2A has a first input 28 interconnected by a lead or electrical line 29 to a juncture point means 30 of a bridge circuit means that is generally indicated by the reference numeral 31 in FIG. 3. A second input 32 of the comparator U2A is interconnected by a lead or electrical line 33 to another juncture point means 34 of the bridge circuit means 31.

The bridge circuit means 31 has two other juncture point means 35 and 36 which are respectively interconnected by leads or electrical lines 37 and 38 as illustrated in FIG. 3 to opposite ends 39 and 40, FIG. 2A, of a secondary winding or coil 41 of a transformer T1 which has another secondary winding or coil 42 and a primary winding or coil 43, the secondary coils 41 and 42 of the transformer T1 comprising an A.C. power supply means for the control system 24 of this invention and such A.C. power supply means is generally indicated by the reference numeral 44 in FIG. 2A.

The A.C. power source means 44, the bridge circuit means 31, the comparator U2A, the microcontroller U1 and the motor 23 previously described all form part of an electrical circuit means of this invention that is generally indicated by the reference numeral 45 in FIGS. 2A, 2B, 3 and 5 and comprising other components and leads or electrical lines as set forth in FIGS. 2A, 2B, 3 and 5 whereby certain of the individual electrical lines, components and interconnections need not be fully set forth as the same are obvious from the drawings. In addition, it can be seen from the drawings that the various components of the electrical circuit means 45 of this invention are respectively given reference characters that are common in the art to represent the component, such as C for a capacitor, R for a resistor, D for a diode, Q for a transistor, etc. with each capital letter thus being followed by a numerical number to distinguish that particular reference letter from the others of a similar component. Therefore, only the components believed necessary to fully understand the various features of this invention will be hereinafter specifically mentioned.

The primary coil 43 of the transformer T1 illustrated in FIG. 2A has one end 46 thereof interconnected by a lead or electrical line 47 to a terminal of a terminal strap J3 while the other end 48 thereof is interconnected by a lead or electrical line 49 to another terminal of the terminal strap J3 so that the terminal strap J3 is adapted to respectively interconnect power source lines designated L1 and N of an electrical power source that is generally indicated by the reference numeral 50 in FIG. 2A and being external to the control device 25 of this invention respectively to the leads 47 and 49 as illustrated in FIG. 2A. The external electrical A.C. power source 50 includes a ground lead GND that is interconnected to a terminal of the terminal strap J3 that provides a ground lead means 51 for the electrical circuit means 45 as illustrated in the drawings.

The bridge circuit means 31 of FIG. 3 comprises a lead or electrical line 52 interconnecting the juncture points 30 and 35 thereof together and having a resistor means R18 therein. Similarly, a lead or electrical line 53 interconnects the juncture points 34 and 35 together and has resistor means R19 and R35 therein as illustrated. The other juncture point 36 of the bridge circuit means 31 is interconnected to the juncture points point means 30 and 34 by leads or electrical lines 54 and 55 which have portions thereof external to another terminal strap J2 of the control device 25 so that an electrode means or resistor means RREF in the lead 54 and another electrode means or resistor means RSENSE in the lead 55 can respectively be disposed in the ion exchange bed 21 of the water softener 20 as illustrated and as provided in the aforementioned U.S. patent to Rak et al, U.S. Pat. No. 4,299,698.

A resistor R17 in a lead or electrical line 56 interconnects the lead 27 from the output port 26 of the comparator U2A to a port 8 of the comparator U2A, the lead 56 being interconnected by a branch lead 57 to ground 58 as illustrated in FIG. 3. Another port 4 of the comparator U2A is interconnected by a lead 59 to a −VFD source that is formed from the secondary coil 42 of the transformer T1 as illustrated in FIG. 2A.

One working embodiment of the control system 24 of this invention is illustrated in the drawings and, unless otherwise specified in the drawings, all resistor values shown in the drawings are in ohms, 0.25 watt, ±5%; all capacitor values shown in the drawings are 50 volts, ±20% and all diodes shown in the drawings are 1N4148.

The microcontroller U1 in such one working embodiment of this invention comprises a Hitachi HD614146 which is a CMOS four bit single chip microcomputer with many features. The features of interest to this invention are a slow speed operation capability (455 kHz), a software standby mode, a halt mode, a 2.5 volt operation and a vacuum fluorescent display drive capability.

One of the main design criteria of the microcontroller U1 for this invention is to maintain time of day (TOD) for up to four hours when A.C. power thereto is removed. The microcontroller U1 is intentionally run at 455kHz so as to minimize current requirements. In addition, when the unit U1 operates in a standby mode during an A.C. power loss, the internal timer of the microcontroller U1 will "wake up" the micro every 8 seconds during the A.C. loss, increment a time loss counter therein and then go back to the standby mode. This results in a further 50% reduction in current requirements. After the four hours have elapsed, the micro U1 goes into a halt mode thereof to save the user programmable parameters thereof as long as possible. In fact, this has been tested to be approximately 20 days.

As illustrated in FIGS. 2A and 2B, the A.C. power supply means 44 for the system 24 of this invention is split into two supplies respectively by the secondary coils 41 and 42. The relay supply −VRELAY produced from the secondary coil 42 is a half wave unregulated supply comprised of a capacitor C10, a diode D2 and a diode D3. The −VFD supply also produced from the secondary coil 42 is a full wave bridge comprised of diodes D1, D2, D3, D4, and D6. A capacitor C3 is a main power supply filter capacity for the −VFD supply and for the microcontroller U1 and a capacitor C2 is a high frequency bypass capacitor. A capacitor C10 is used only for the relay drive circuit and will drop in voltage without significantly affecting the other power supply, −VFD. A zener diode Z1, a resistor R3, a resistor R4 and a transistor Q1 form a series pass transistor regulator circuit that maintains approximately −5.0 volts to the microcontroller U1 and to a capacitor C4 when power is supplied by the external A.C. power source 50 to the transformer T1. The capacitor C4 should be fully charged after approximately 45 minutes and the value of a resistor R5 was chosen to have a reasonable charge time and not to have excessive charge current when the capacitor C4 is discharged.

The sole purpose of the capacitor C4 and the resistor R5 is to provide power to the microcontroller U1 during times of A.C. power loss. The value of the resistor R5 is selected to limit the charge current when the capacitor C4 is discharged and minimize the voltage drop while operating the microcontroller U1 in a standby mode thereof. The microcontroller U1 will keep time up to approximately 4 hours after A.C. power loss by operating in the standby mode and awakening every 8 seconds to log the time increment. After the 4 hour period has lapsed, the microcontroller U1 will then go into a halt mode thereof in an attempt to maintain parameters for a longer period of time.

The microcontroller U1 will power up and reset for at least one msec after power at the microcontroller U1 reaches approximately 3.5 volts. The microcontroller U1 will see a reset pulse (on power up) if power is removed and the micro voltage drops to approximately 3.5 volts. The microcontroller U1 will not see a reset on power loss. The microcontroller U1 reset pulse width is not any shorter than approximately 100 uSeconds and the microcontroller U1 will consume zero power during backup operation.

Under normal conditions, the microcontroller U1 will not lose power for up to 4 hours after loss of A.C. power thereto. Under these conditions, a reset (on reapplication of the A.C. power supply) is not necessary for the proper operation of the microcontroller U1. However, one will be produced whenever the capacitor C3 voltage becomes more positive than approximately −4.9 volts.

The microcontroller U1 needs an accurate time keeping reference in order to maintain an accurate time clock to operate the water softener 20 such in the manner fully set forth in the aforementioned U.S. patent to Rak et al, U.S. Pat. No. 4,299,698.

Accordingly, a resistor R7, a resistor R8, a resistor R9, a capacitor C7, a transistor Q3 and a resistor R10 as illustrated in FIGS. 2A and 2B form a reference signal that is directed by a lead or electrical line 60 to an inlet port 60' of the microcontroller U1. With this circuit, the transistor Q3 is going to turn off whenever the voltage is positive and is going to turn on whenever the voltage is negative. This produces a positive edge whenever the secondary voltage out of the transformer coil 42 goes negative.

In addition to this portion of the circuit means 45 being a 60 Hz reference, the negative edge thereof is used for comparison to the output signal in line 27, FIG. 3, to the inlet port 27' of the microcontroller U1 as will be apparent hereinafter.

The portion of the electrical circuit 45 of this invention illustrated in FIG. 3 is known as an aqua sensor and is generally given the reference numeral 61 in FIG. 3.

It should be noted that the aqua sensor 61 is referenced to the voltage at the secondary coil 41 by the leads 37 and 38 previously described whereby it is most important that the phase of the two secondary power supplies provided respectively by the secondary coils 41 and 42 is established and maintained. It is also important that some margin be maintained between the 60 Hz negative edge and the aqua sensor edge. The values of the resistor R7, the resistor R8 and the capacitor C7 are optimized so that under the worst case conditions, the negative edge of the 60 HZ reference is approximately 1 millisecond before the edge of the aqua sensor output.

As previously described, the aqua sensor 61 is a simple AC bridge circuit 31 that changes the phase of the comparator output 26 on line 27 based on the voltage of the inputs 28 and 32 of the comparator U2A. The resistor R17 is the pullup for the comparator output 26. A voltage divider is created between the resistor R18 (a 200 ohm resistor) and the in tank sensor resistor RREF. Another voltage divider is created between the resistor R19 (a 215 ohm resistor), the resistor R35 (a 1 ohm resistor) and the other in tank sensor resistor RSENSE. When the resin bed 21 is refreshed, the reference resistor RREF is at approximately 150 ohms and the sensor resistor RSENSE will be at approximately 150 ohms. At this point in time, the aqua sensor input at pin 27' of the microcontroller U1 will be "low" when referenced to the falling edge of the 60 HZ reference.

Figure 4:
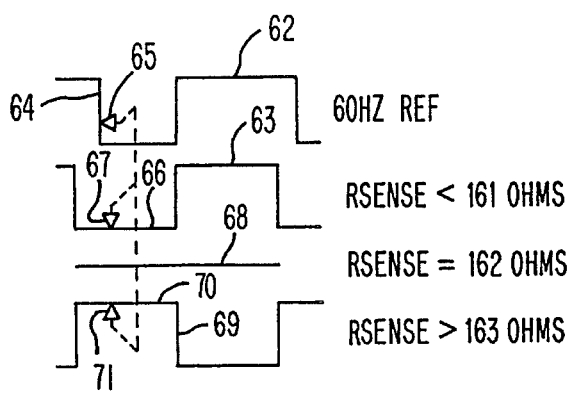
FIG. 4 is a graph that illustrates the phase of the A.C. power source for the system of this invention and the output phase of the comparator of the system at various resistance values of the sensing electrode means that is disposed in the ion exchange bed of the water softener.

For example, see FIG. 4 wherein the phase of the 60 HZ reference being produced at the input pin 60' of the microcontroller U1 is represented by the line 62 and designated 60 HZ REF. Also, the phase of the output of the comparator U2A on lead 27 is represented by the line 63 in FIG. 4 when the resistance value of the electrode means RSENSE is less than 161 ohms.

The microcontroller U1 upon detecting a falling edge 64 on the phase of the 60 HZ REF as represented by the arrow 65 reads at the input port 27' a "low" signal represented by the portion 66 of the phase line 63 for the RSENSE having a resistance value below 161 ohms as represented by the arrow 67 in FIG. 4.

As the resin bed 21 of the water softener 20 is exhausted, the resistance value of the electrode means RSENSE slowly increases to more than 165 ohms. When the resin bed 21 is approximately 67% exhausted, the resistance value of the electrode means RSENSE is at approximately 162 ohms as represented by the line 68 in FIG. 4 and then the bridge circuit changes phase at the output 26 in line 27 of the aqua sensor 61 as represented by the line 69 in FIG. 4 so that the output signal of the comparator U2A is in phase with the 60 HZ reference as illustrated in FIG. 4. It is important to note that as the sense resistance value of the electrode means RSENSE approaches 162 ohms, the output pulses on the line 27 will get more and more narrow until they actually cease to exist as represented by the line 68 in FIG. 4. This is at the point at which the aqua sensor 61 will trip, i.e. the microcontroller U1 will now see at a falling edge 64 of the 60 HZ REF a "high" portion 70 on the line 69 as represented by the arrow 71 in FIG. 4. Thus, when the resistance value of the electrode means RSENSE passes through this point, the output phase of the signal on the line 27 to the input 27' of the microcontroller U1 will have changed and the pulses thereof will become wider and wider. This is typically a very small region in the miliohm range, but must be considered when looking at the pulse width of the 60 HZ reference.

If the resin bed were to continue to be exhausted, then both in tank resistors RREF and RSENSE would increase in resistance to more than 165 ohms and this would look the same as if they were at 150 ohms.

However, when the microcontroller U1 determines a "high" 70 on the output signal in line 27 at the inlet port 27' thereof, the microcontroller U1 knows that the ion exchange bed 21 should be rejuvenated and that such rejuvenation will take place at the particular time period that has been programmed into the microcontroller U1 for the reasons fully set forth in the aforementioned patent to Rak et al, U.S. Pat. No. 4,299,698.

At such time, the microcontroller U1 pulls the output D10 thereof to ground as illustrated in FIG. 5 thus energizing a transistor Q4 so that current flows through the relay coil K1A to close the contacts K1B and thereby interconnect the external power source lines L1 and N to opposite sides of the motor 23 to energize the motor 23 for operating the control means 22 of the water softener 20 for rejuvenating the ion exchange bed 21 in the manner fully set forth in the aforementioned patent to Rak et al, U.S. Pat. No. 4,299,698.

It can be seen in FIG. 5 that a resistor R20 is a current limiting resistor and determines the amount of base drive current available for the transistor Q4. The base drive current is such that when the transistor Q4 is on it is saturated thus extending its life. A pull down resistor is internal to the microcontroller U1 and when port D10 is turned off (PFET is off), the base emitter voltage goes to zero. A diode D5 is employed as a simple fly back diode for the turn off of the relay coil K1A.

Thus, it can be seen that the microcontroller U1 of the control system 24 of this invention has means for determining when the ion exchange bed 21 of the water softener 20 is to be rejuvenated by comparing the phase of the output signal means of the comparator U2A with the phase of the reference voltage 60 HZ REF, such means of the microcontroller U1 determining if the output signal means at the inlet port 27' thereof is "high" or "low" on a negative edge 64 of the phase of the 60 HZ REF that is being fed to the inlet port 60' thereof as previously set forth.

Accordingly, when the microcontroller U1 determines that the phase of the output 26 of the comparator U2A shifts as represented by the shift from the line 63 to the line 69 in FIG. 4 so that the output goes "high" at the portion 70 thereof upon a falling edge 67 of the reference line 62, it is time for the ion exchange bed 21 to be rejuvenated and then the microcontroller U1 controls such regeneration operation through energizing the motor 23 for the controller means 22 at an appropriate subsequent time period.

Thus, it can be seen that this invention not only provides a new control system for a water softener and a new control device for such a system, but also this invention provides a new method of making such a control system and a new method of making such a control device.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a control system for a water softener that has an ion exchange bed and a recycling means for said bed, said system comprising a pair of resistor means, reference electrode means, sensing electrode means, said electrode means being disposed in said bed, said electrode means and said resistor means comprising a bridge circuit means having juncture point means, and A.C. power supply means for supplying an A.C. signal means to said bridge circuit means and having a certain phase, a comparator having a first input means for receiving a first signal from one of said juncture point means that is disposed between said reference electrode means and one of said pair of resistor means and having a second input means for receiving a second input signal from another of said juncture point means that is disposed between said sensing electrode means and the other of said pair of resistor means, said comparator having an output means, said output means having a phase, and a microcontroller means having means operatively interconnected to said output means for receiving output signal means therefrom and having means to effect a subsequent operation of said recycling means when said output signal means is at a certain condition thereof, said system having means for causing said output signal means to have a phase shift relative to said certain phase when said sensing electrode means is at a certain resistance value relative to the resistance value of said reference electrode means, said phase shift comprising said certain condition of said output signal means, the improvement wherein said microcontroller means has means for detecting said certain condition by comparing said phase of said output signal means to said certain phase, said microcontroller means having means operatively interconnected to said A.C. power supply means so as to use said certain phase thereof as a reference for comparing with said phase of said output signal means.

2. A control system as set forth in claim 1 wherein said microcontroller means has means to determine if the output signal means is "high" or "low" on a negative edge of said certain phase.

3. A control system as set forth in claim 1 and comprising a capacitor means operatively interconnected to said microcontroller means and to said A.C. power supply means to provide power to said microcontroller means during loss of power by said A.C. power supply means.

4. A control system as set forth in claim 3 wherein said microcontroller means has means to go into a standby mode thereof for a certain time period after the loss of power by said A.C. power supply means and then to go into a halt mode thereof after the lapse of said certain time period if said loss of power continues beyond said certain time period.

5. In a control device for a water softener that has an ion exchange bed and a recycling means for said bed, said device comprising a pair of resistor means, said bed having reference electrode means and sensing electrode means disposed in said bed, said electrode means and said resistor means being adapted to comprise a bridge circuit means having juncture point means, said control device comprising an A.C. power supply means for supplying an A.C. signal means to said bridge circuit means and having a certain phase, a comparator having a first input means for receiving a first signal from one of said juncture point means that is disposed between said reference electrode means and one of said pair of resistor means and having a second input means for receiving a second input signal from another of said juncture point means that is disposed between said sensing electrode means and the other of said pair of resistor means, said comparator having an output means, said output means having a phase, and a microcontroller means having means operatively interconnected to said output means for receiving output signal means therefrom and having means to effect a subsequent operation of said recycling means when said output signal means is at a certain condition thereof, said control device having means for causing said output signal means to have a phase shift relative to said certain phase when said sensing electrode means is at a certain resistance value relative to the resistance value of said reference electrode means, said phase shift comprising said certain condition of said output signal means, the improvement wherein said microcontroller means has means for detecting said certain condition by comparing said phase of said output signal means to said certain phase, said microcontroller means having means operatively interconnected to said A.C. power supply means so as to use said certain phase thereof as a reference for comparing with said phase of said output signal means.

6. A control device as set forth in claim 5 wherein said microcontroller means has means to determine if the output signal means is "high" or "low" on a negative edge of said certain phase.

7. A control device as set forth in claim 5 and comprising a capacitor means operatively interconnected to said microcontroller means and to said A.C. power supply means to provide power to said microcontroller means during loss of power by said A.C. power supply means.

8. A control device as set forth in claim 7 wherein said microcontroller means has means to go into a standby mode thereof for a certain time period after the loss of power by said A.C. power supply means and then to go into a halt mode thereof after the lapse of said certain time period if said loss of power continues beyond said certain time period.

9. In a method of making a control system for a water softener that has an ion exchange bed and a recycling means for said bed, said system comprising a pair of resistor means, reference electrode means sensing electrode means, said electrode means being disposed in said bed, said electrode means and said resistor means comprising a bridge circuit means having juncture point means, an A.C, power supply means for supplying an A.C. signal means to said bridge circuit means and having a certain phase, a comparator having a first input means for receiving a first signal from one of said juncture point means that is disposed between said reference electrode means and one of said pair of resistor means and having a second input means for receiving a second input signal from another of said juncture point means that is disposed between said sensing electrode means and the other of said pair of resistor means, said comparator having an output means, said output means having a phase, and a microcontroller means having means operatively interconnected to said output mean for receiving output signal means therefrom and having means to effect a subsequent operation of said recycling means when said output signal means is at a certain condition thereof, said system having means for causing said output signal means to have a phase shift relative to said certain phase when said sensing electrode means is at a certain resistance value relative to the resistance value of said reference electrode means, said phase shift comprising said certain condition of said output signal means, the improvement comprising the steps of forming said microcontroller means to have means for detecting said certain condition by comparing said phase of said output signal means to said certain phase, and forming said microcontroller means to have means operatively interconnected to said A.C. power supply means so as to use said certain phase thereof as a reference for comparing with said phase of said output signal means.

10. A method of making a control system as set forth in claim 9 and comprising the step of forming said microcontroller means to have means to determine if the output signal means is "high" or "low" on a negative edge of said certain phase.

11. A method of making a control system as set forth in claim 9 and comprising the step of operatively interconnecting capacitor means to said microcontroller means and to said A.C. power supply means to provide power to said microcontroller means during loss of power by said A.C. power supply means.

12. A method of making a control system as set forth in claim 11 and comprising the step of forming said microcontroller means to have means to go into a standby mode thereof for a certain time period after the loss of power by said A.C. power supply means and then to go into a halt mode thereof after the lapse of said certain time period if said loss of power continues beyond said certain time period.

13. In a method of making a control device for a water softener that has an ion exchange bed and a recycling means for said bed, said device comprising a pair of resistor means, said bed having reference electrode means and sensing electrode means disposed in said bed, said electrode means and said resistor means being adapted to comprise a bridge circuit means having juncture point means, said control device comprising an A.C. power supply means for supplying an A.C. signal means to said bridge circuit means and having a certain phase, a comparator having a first input means for receiving a first signal from one of said juncture point means that is disposed between said reference electrode means and one of said pair of resistor means and having a second input means for receiving a second input signal from another of said juncture point means that is disposed between said sensing electrode means and the other of said pair of resistor means, said comparator having an output means, said output means having a phase, and a microcontroller means having means operatively interconnected to said output means for receiving output signal means therefrom and having means to effect a subsequent operation of said recycling means when said output signal means is at a certain condition thereof, said control device having means for causing said output signal means to have a phase shift relative to said certain phase when said sensing electrode means is at a certain resistance value relative to the resistance value of said reference electrode means, said phase shift comprising said certain condition of said output signal means, the improvement comprising the steps of forming said microcontroller means to have means for detecting said certain condition by comparing said phase of said output signal means to said certain phase, and forming said microcontroller means to have means operatively interconnected to said A.C. power supply means so as to use said certain phase thereof as a reference for comparing with said phase of said output signal means.

14. A method of making a control device as set forth in claim 13 and comprising the step of forming said microcontroller means to have means to determine if the output signal means is "high" or "low" on a negative edge of said certain phase.

15. A method of making a control device as set forth in claim 13 and comprising the step of operatively interconnecting capacitor means to said microcontroller means and to said A.C. power supply means to provide power to said microcontroller means during loss of power by said A.C. power supply means.

16. A method of making a control device as set forth in claim 15 and comprising the step of forming said microcontroller means to have means to go into a standby mode thereof for a certain time period after the loss of power by said A.C. power supply means and then to go into a standby mode thereof after the lapse of said certain time period if said loss of power continues beyond said certain time period.

* * * * *